United States Patent [19]
Herron et al.

[11] Patent Number: 5,658,419
[45] Date of Patent: Aug. 19, 1997

[54] CURING ENVELOPE SPREADER FOR USE IN A TIRE RETREADING PROCESS

[76] Inventors: Thomas F. Herron, P.O. Box 605; George Jeffrey Harris, R.R. #3, P.O. Box 83, both of New Cumberland, W. Va. 26047

[21] Appl. No.: 583,460

[22] Filed: Jan. 5, 1996

[51] Int. Cl.$^6$ .................................................. B29D 30/54
[52] U.S. Cl. .......................... 156/394.1; 156/96; 425/17
[58] Field of Search ................... 156/96, 909, 406.2, 156/394.1, 421.8; 425/17, 39, 48; 414/426

[56] References Cited

U.S. PATENT DOCUMENTS

| | | | |
|---|---|---|---|
| 3,865,669 | 2/1975 | Todd | 156/406.2 |
| 3,976,532 | 8/1976 | Barefoot | 156/406.2 |
| 4,437,920 | 3/1984 | Kubo | 156/406.2 |
| 4,902,380 | 2/1990 | Olson | 156/406.2 |
| 5,154,794 | 10/1992 | Olson | 156/96 |
| 5,441,587 | 8/1995 | Byerley | 156/406.2 |

*Primary Examiner*—Geoffrey L. Knable
*Attorney, Agent, or Firm*—David V. Radack; Eckert Seamans Cherin & Mellott, LLC

[57] ABSTRACT

A curing envelope spreader used to encase a tire during a tire retreading process. The curing envelope spreader includes a frame and a plurality of a curing envelope engaging means mounted to the frame. Each of the curing envelope engaging means is movable in an generally radially outward path to spread the curing envelope. An associated method of retreading a tire is also provided.

25 Claims, 8 Drawing Sheets

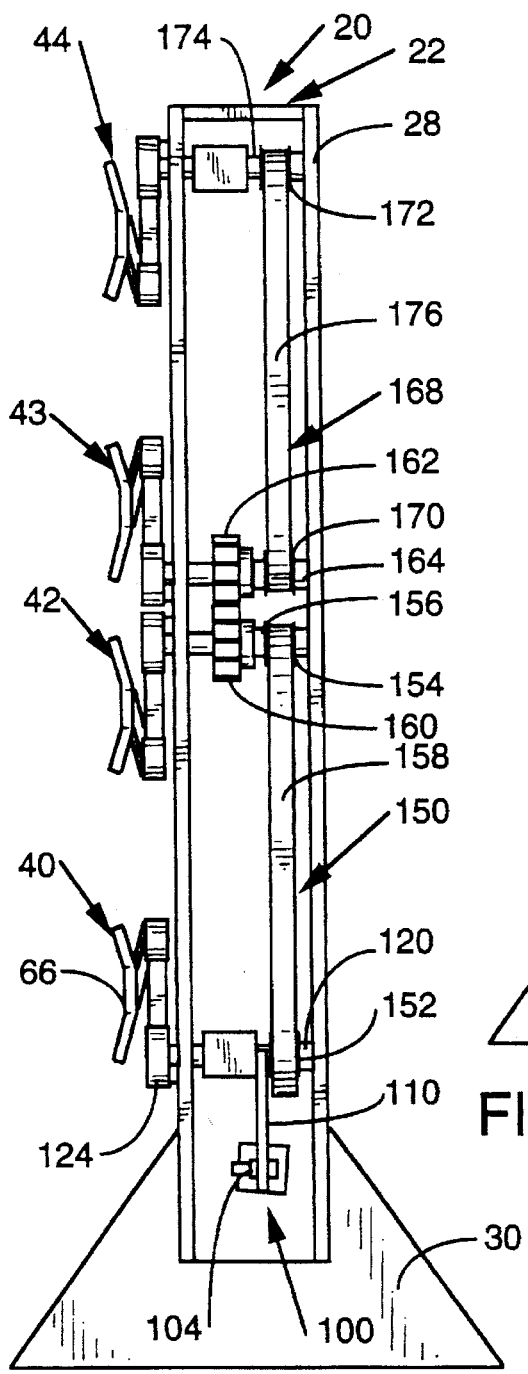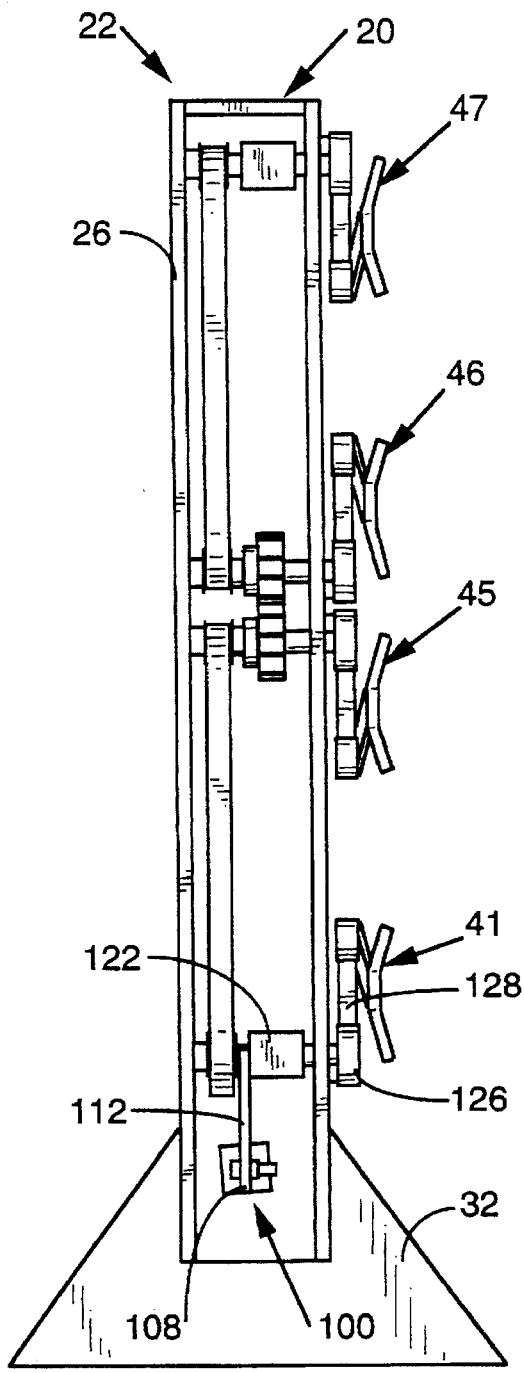
FIG. 7
FIG. 8

CURING ENVELOPE SPREADER FOR USE IN A TIRE RETREADING PROCESS

BACKGROUND OF THE INVENTION

This invention relates to a curing envelope spreader for use in a tire retreading process and an associated method.

Retreading of tires, especially large truck and bus tires, is an economical and efficient way to get more life out of a tire and is becoming more and more prevalent as new truck and bus tires become more expensive. In one type of tire retreading process, the used vehicle tire is brought to a retreading shop and the old tread is removed and the tire casing is conditioned to receive the new tread. See, e.g., U.S. Pat. No. 3,728,181. Once the new tread is placed on the tire casing a curing envelope is placed around the retreaded tire. See U.S. Pat. Nos. 4,203,793; 4,434,018; and 4,634,357. The retreaded tire, which is now surrounded by the curing envelope, is then placed in a curing chamber where a combination of time, pressure and temperature are used to securely bond the tread of the casing. See U.S. Pat. No. 4,201,610. All patents referenced to herein are expressly incorporated by reference.

In large retreading shops, the tires are moved from place to place by the use of an overhead monorail from which a hook can be hung. The hook engages the tire and the overhead monorail system moves the tire from, for example, the retreading station to the curing chamber. The monorail system speeds along the retreading process and reduces work-related injuries. This increases productivity while at the same time reducing costs.

In the monorail system, it is advantageous to minimize the number of times the tire has to be removed from the hook to be worked on and then placed back on the hook to be moved to a different station. This is because manual operator labor can be avoided, with its attendant costs and productivity losses. Less manual labor also reduces the possibility of operator injury from lifting and moving of the tires.

With current retreading systems, the tire is removed from the hook in order to either place the curing envelope on the tire or remove the curing envelope from the tire after curing or both. Furthermore, the curing envelope is usually placed on and removed from the tire manually. This is strenuous, difficult and repetitive manual labor. Thus, there is not only low productivity but also the possibility of operator injury with current processes where manual labor is used to place on and/or remove the curing envelope from the tire.

What is needed, therefore, is an efficient and effective way to safely and easily place a curing envelope onto a retreaded tire and then remove the curing envelope from the retreaded tire after curing without the need for manual labor. Furthermore, the curing envelope should be able to be placed on or removed from the tire without a major disruption in the retreading process.

SUMMARY OF THE INVENTION

The invention has met or exceeded the above-mentioned needs as well as others. The curing envelope spreader used to encase a tire during a tire retreading process comprises a frame and a plurality of a curing envelope engaging means mounted to the frame. Each of the curing envelope engaging means is movable in an generally radially outward path to spread the curing envelope so that the tire can be placed therein.

An associated method of retreading a tire is also provided in which a tire casing is provided on which is placed a tire tread to create an uncured retreaded tire. The uncured retreaded tire is encased in a curing envelope by using a curing envelope spreader apparatus. The curing envelope spreader apparatus has a frame and a plurality of curing envelope engaging means mounted to the frame. Each of the curing envelope engaging means are movable in a generally radially outward path to spread the curing envelope so that the uncured retreaded tire may be placed into the curing envelope. The encased, uncured retreaded tire is then cured in order to securely bond the tire tread to the tire casing. After curing, the curing envelope is removed by means of the curing envelope spreader apparatus.

BRIEF DESCRIPTION OF THE DRAWINGS

A full understanding of the invention can be gained from the following description of the preferred embodiment when read in conjunction with the accompanying drawings in which:

FIG. 7 is a right side elevational view showing the hydraulic means.

FIG. 8 is a left side elevational view showing the hydraulic means.

DETAILED DESCRIPTION

Figure 1:
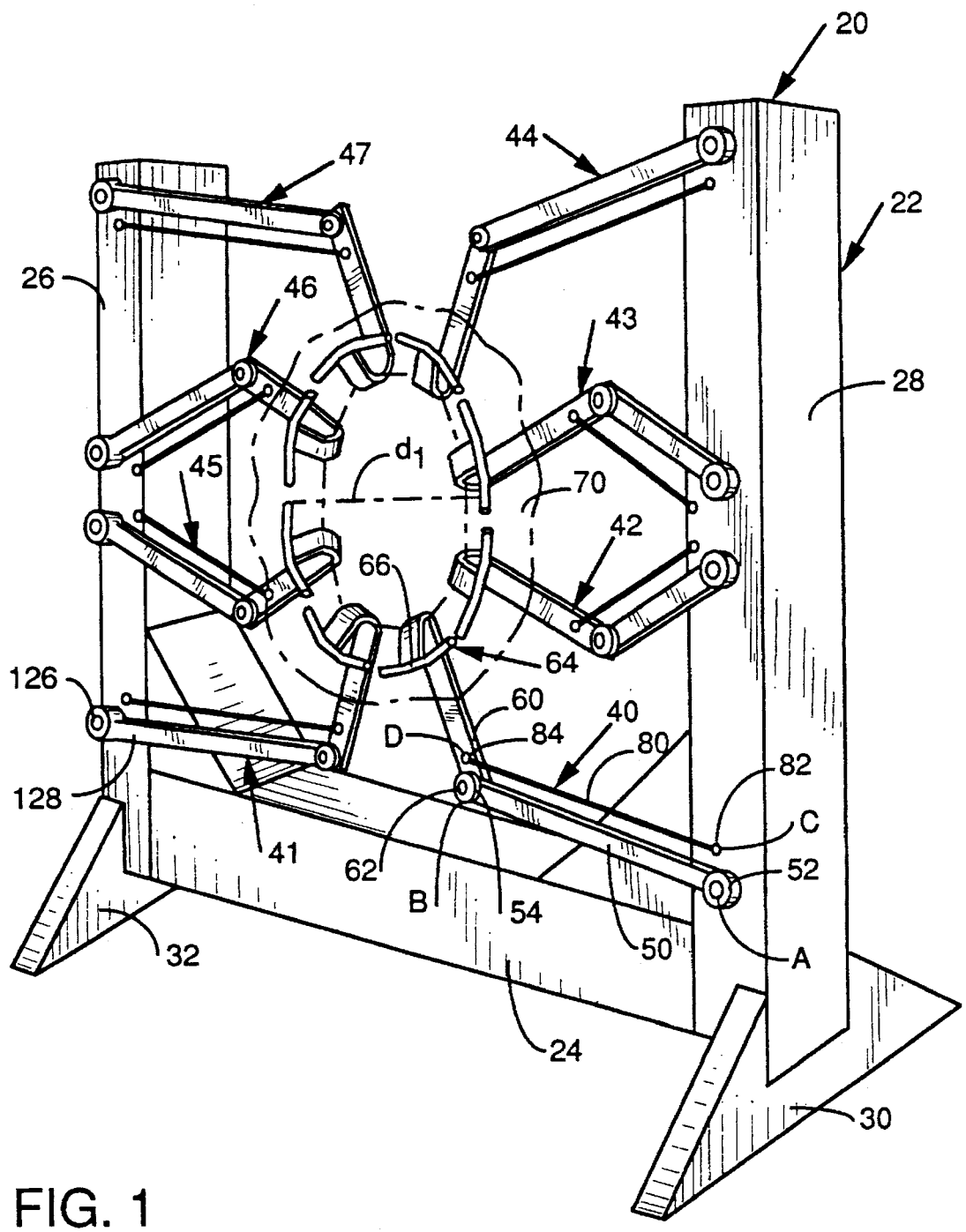
FIG. 1 is a front perspective view of the curing envelope spreader of the invention showing the curing envelope before spreading in phantom line drawing.

Referring now particularly to FIG. 1, the curing envelope spreader 20 of the invention is shown. The curing envelope spreader 20 includes a U-shaped frame 22 consisting of a horizontal base portion 24, a left support housing 26 and a right support housing 28. The base 24 is supported by two leg members 30 and 32. The frame is preferably constructed of a rigid material, such as steel. It will be appreciated that the base portion 24, left support housing 26 and right support housing 28 each define enclosed spaces (not seen in this view) which will contain the hydraulic means that will be described below with respect to FIGS. 5–8. The frame 22, being U-shaped, allows for the apparatus 20 to be used in a tire retreading shop which includes an overhead monorail system. Thus, it will be appreciated that the tire to be encased in the curing envelope does not need to be removed from the hook hanging from the monorail in order to be encased in the curing envelope. After being encased in the curing envelope, the encased tire is merely passed through the curing envelope spreader 20 for further processing.

Figure 2:
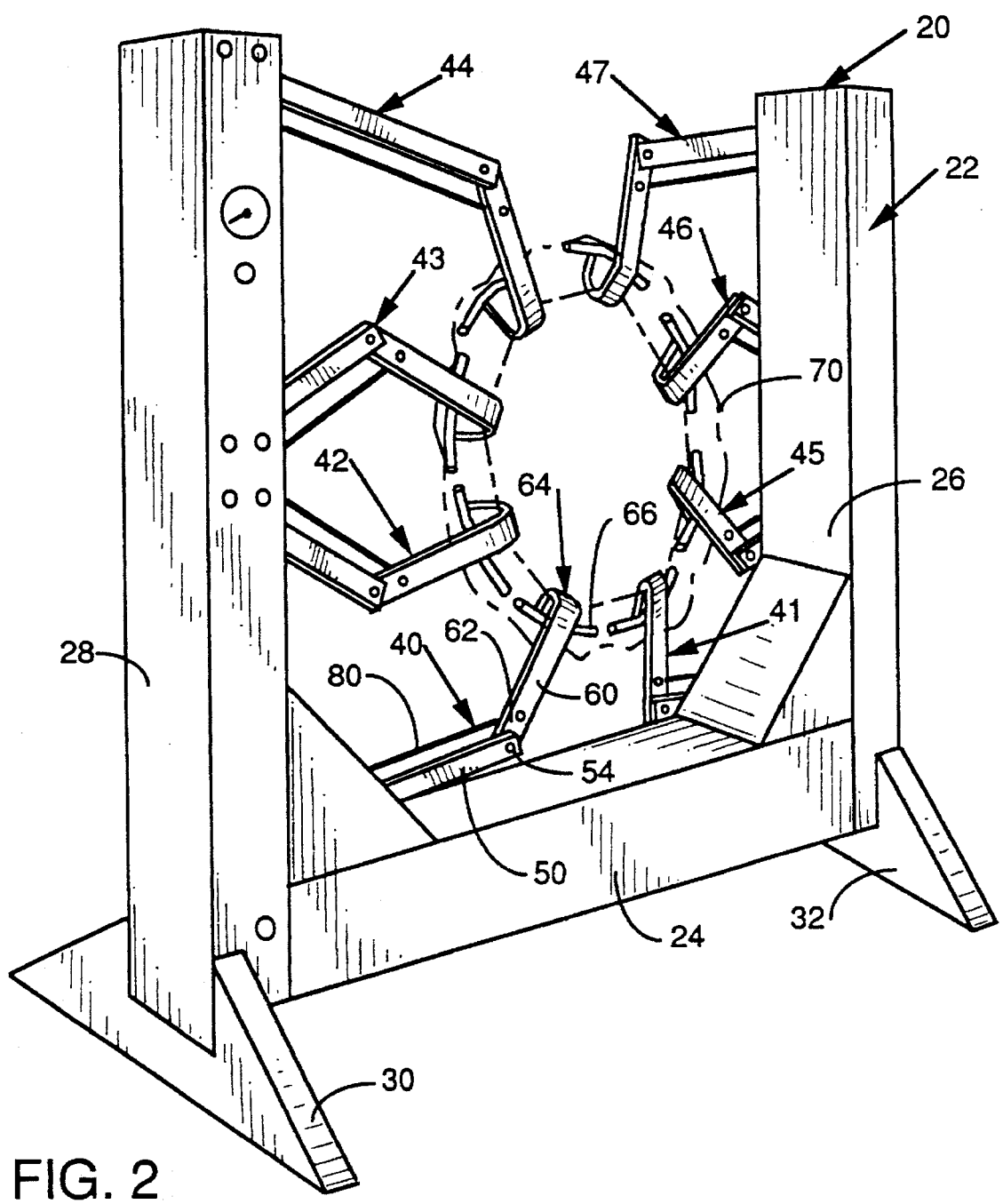
FIG. 2 is a back perspective view of the curing envelope spreader of the invention showing the curing envelope before spreading in phantom line drawing.

The curing envelope spreader 20 further consists of a plurality of curing envelope engaging means. Shown in FIGS. 1 and 2 are eight curing envelope engaging means, i.e., a first curing envelope engaging means 40; a second curing envelope engaging means 41; a third curing envelope engaging means 42; a fourth curing envelope engaging means 43; a fifth curing envelope engaging means 44; a sixth curing envelope engaging means 45; a seventh curing envelope engaging means 46; and an eighth curing envelope engaging means 47. Each curing envelope engaging means, such as the first curing envelope engaging means 40, consists of an arm 50 having a frame engaging portion 52 which is pivotably mounted to the right support housing 28 and a hand engaging portion 54 opposite the frame engaging portion 52. The first curing envelope engaging means 40 then includes a hand 60 having an arm engaging portion 62 pivotably mounted to the hand engaging portion 54 of the arm 50 and an envelope engaging portion 64 Opposite the arm engaging portion 62. The envelope engaging portion 64 includes a flange 66 that engages a portion of the curing envelope 70 (shown in phantom line drawing) that is to be spread by the curing envelope,spreader 20. As can be seen in FIG. 1, the flange, 66 is generally arcuate in shape. The first curing envelope engaging means 40 also includes a pantograph rod 80. The pantograph rod 80 has a first end portion 82 pivotably mounted to the right support housing 28 and a second end portion 84 pivotably mounted to the hand 60. A detailed view of the curing envelope engaging means can also be seen in FIG. 9.

Referring now to FIGS. 1-4, the spreading of the curing envelope 70 will be explained. As can be seen by observing FIGS. 3 and. 4, each of the curing envelope engaging means 40-47 are moved in a generally radially outward path in order to spread the curing envelope 70. It will be appreciated that once the envelope 70 is spread, the tire 90 (FIG. 4) to be placed in the envelope 70 can be easily loaded into the envelope 70 by bringing it from the back of the spreader 20 and placing it in the curing envelope 70. Once loaded into the curing envelope 70, the curing envelope engaging means 40-47 are moved generally radially inward from their position shown in FIGS. 3 and 4 to the position shown in FIGS. 1 and 2. At this point, the tire 90 in the curing envelope 70 can be moved by the monorail system (not shown) to the next station for further processing. It will be appreciated that the curing envelope spreader 20 eliminates the need to manually enclose the tire in a curing envelope, thus increasing productivity of the tire retreading shop while at the same time substantially reducing the incidence of operator injury.

Figure 3:
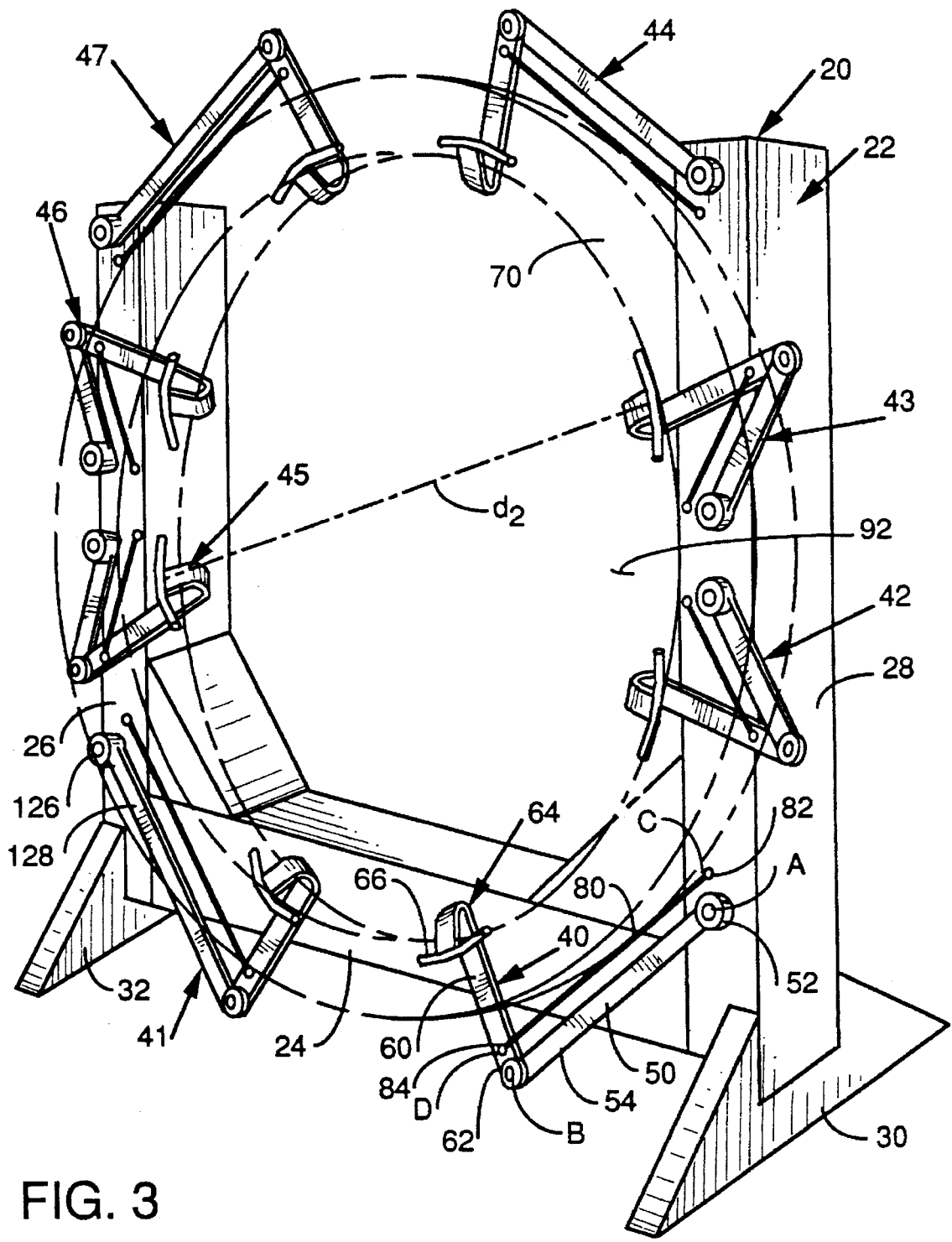
FIG. 3 is a front perspective view of the curing envelope spreader of the invention showing the curing envelope in phantom line drawing after being spread open.

The curing envelope engaging means 40-47 are arranged to define a first circle having a first diameter $d_1$ (FIG. 1) before spreading of the curing envelope 70 and after spreading the curing envelope engaging means 40-47 are arranged to define a second circle having a second diameter $d_2$ (FIG. 3). Although it will be appreciated that the diameters can be of any desired dimension, the second diameter is usually a little bit greater than the diameter of the tire 90 which is to be encased in the curing envelope 70. In practice, the diameter of a standard truck tire is fifty-two inches. Thus, the first diameter is usually between about 12 to 20 inches with the second diameter being between about 40 to 60 inches.

In accordance with the invention, and as can be seen in FIGS. 1-4, the pantograph rods of the curing engaging means 40-47 all remain generally parallel to their respective arms. For example, for curing engaging means 40, the pantograph rod 80 remains generally parallel to arm 50 all through the radial movement of the curing engaging means 40. Thus, the pantograph rod 80 forces the hand 60 to move in a generally radially outward direction to open the envelope 70. If the pantograph rod 80 was not present, the hand 60 may buckle and thus not move in a generally radially outward direction. This would mean that the envelope 70 would not be spread open to form a circle, thus making it more difficult to place the tire 90 therein.

Figure 4:
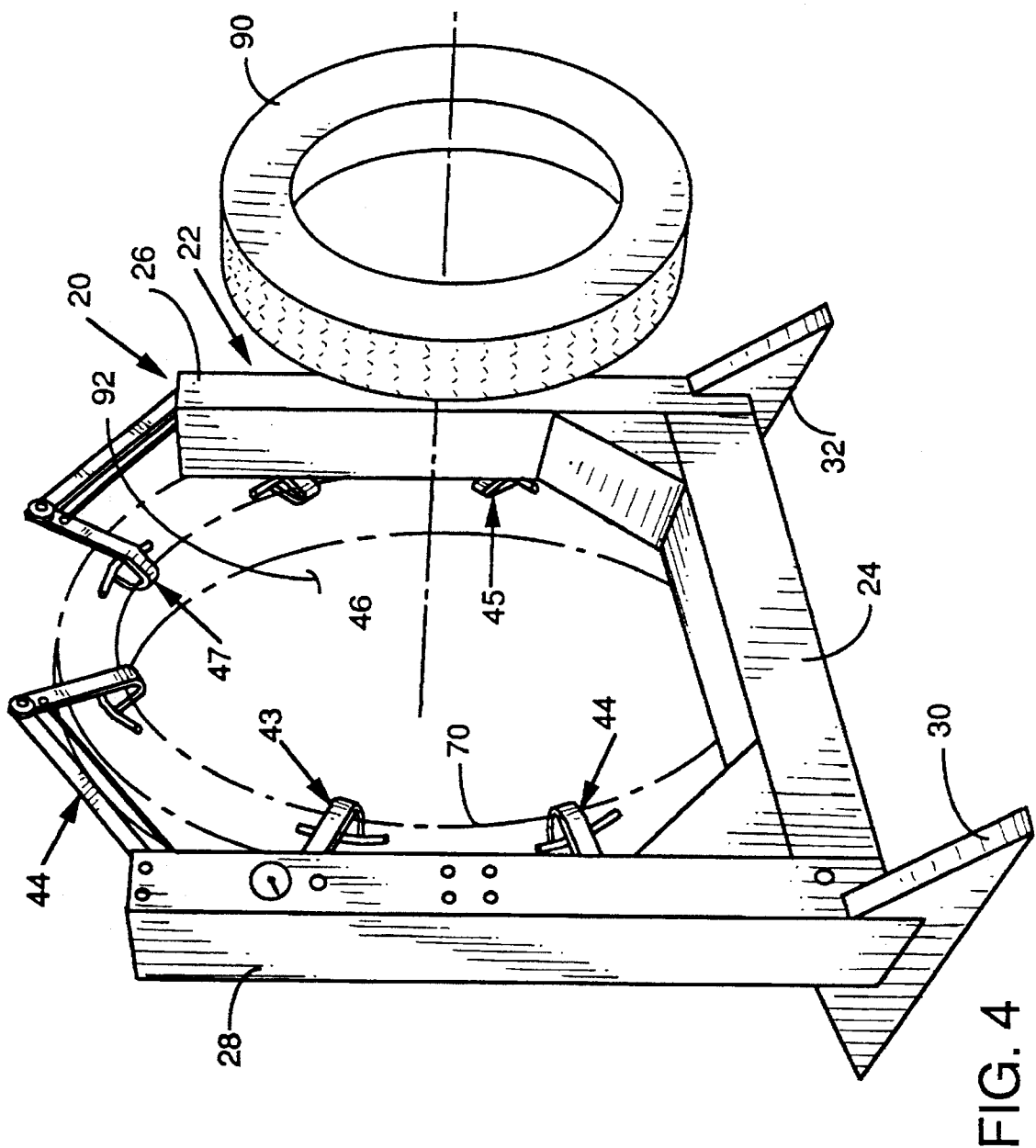
FIG. 4 is a back perspective view of the curing envelope spreader of the invention showing the curing envelope in phantom line drawing after being spread open.

The frame engaging portion 52 of the arm 50 is pivotably mounted to the right side housing support 28 at pivot point A and the arm 50 is pivotably mounted to the hand 60 at pivot point B. The pantograph rod 80 is pivotably mounted to the right side housing support 28 at pivot point C and the pantograph rod 80 is pivotably mounted to the hand 60 at pivot point D. It will be appreciated that points A-B-C-D form a parallelogram at all positions of the curing envelope engaging means 40. This insures that the curing envelope 70 is spread so that a circular opening 92, as seen in phantom line drawing in FIGS. 3 and 4, is formed in order for the tire 90 to be encased in the curing envelope 70 to be easily placed in the curing envelope 70.

Figure 5:
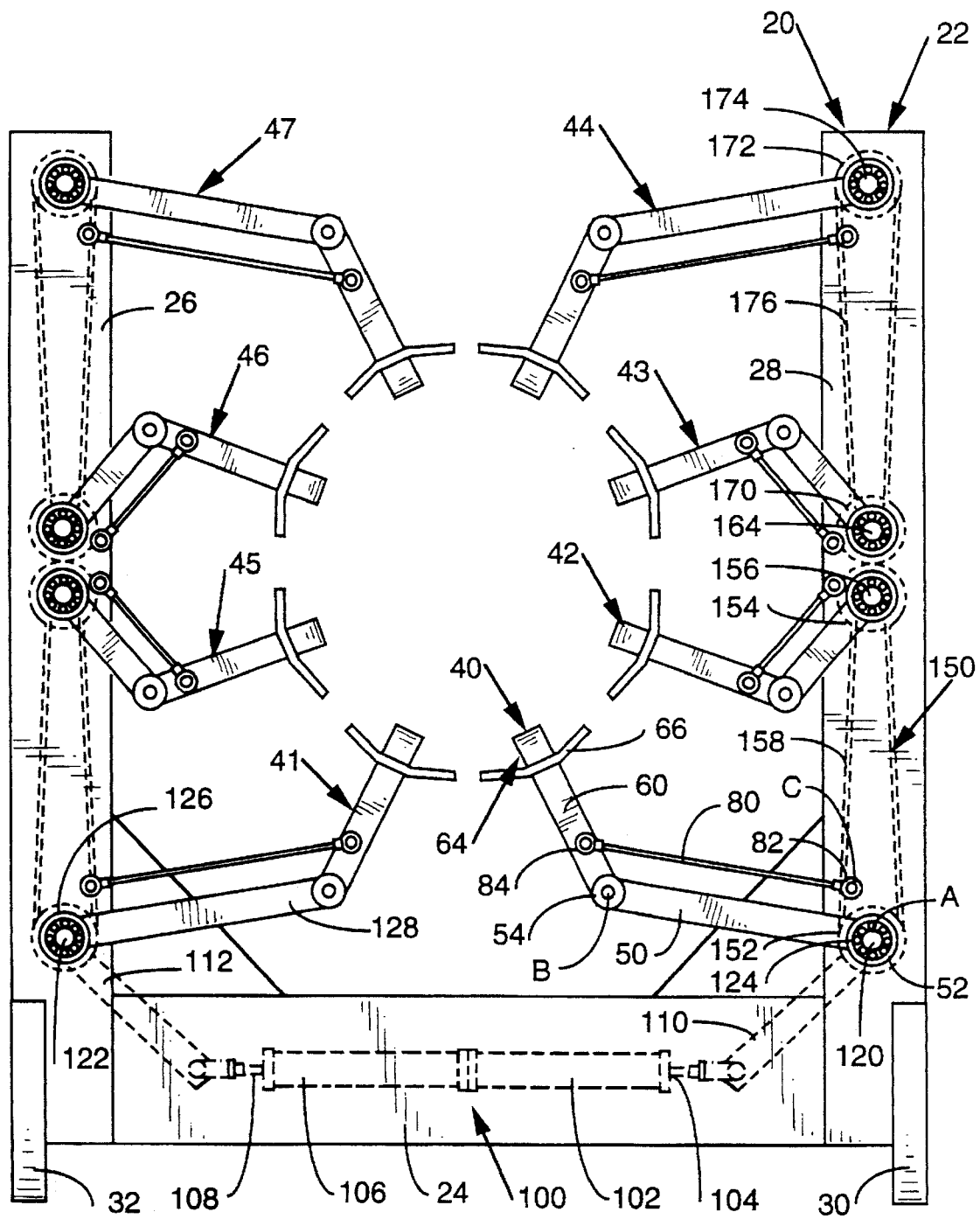
FIG. 5 is a front elevational view showing the double acting hydraulic means of the invention.

Referring now to FIGS. 5-8, the hydraulic means 100 for moving the curing envelope engaging means 40-47 will be explained. Referring specifically to FIG. 5, a double acting cylinder means 100 is shown which includes a first cylinder 102 having a first cylinder rod 104 mounted for reciprocal translational movement with respect to the first cylinder 102 and a second cylinder 106 secured to the first cylinder 102, the second cylinder 106 having a second cylinder rod 108 mounted for reciprocal translational movement with respect to the second cylinder 106. The first cylinder 102 and second cylinder 104 are not secured in any way to the base portion 24 of the frame 22 and thus are free to move vertically up and down as will be explained with respect to FIG. 6. Alternatively, a single cylinder having rods extending from either side thereof can be used. The single cylinder has the advantage of less cost and a reduction in the amount of air plumbing that is necessary.

A first connecting rod 110 is secured to the end of first cylinder rod 104 and a second connecting rod 112 is secured to the end of second cylinder rod 108. These connecting rods 110 and 112 are then secured to rotatable shafts 120 and 122 respectively, as can be seen by observing FIGS. 7 and 8. The shafts 120 and 122 are then secured to bearings 124 and 126 associated with the arms 50 and 128 of respective curing envelope engaging means 40 and 41.

Figure 6:
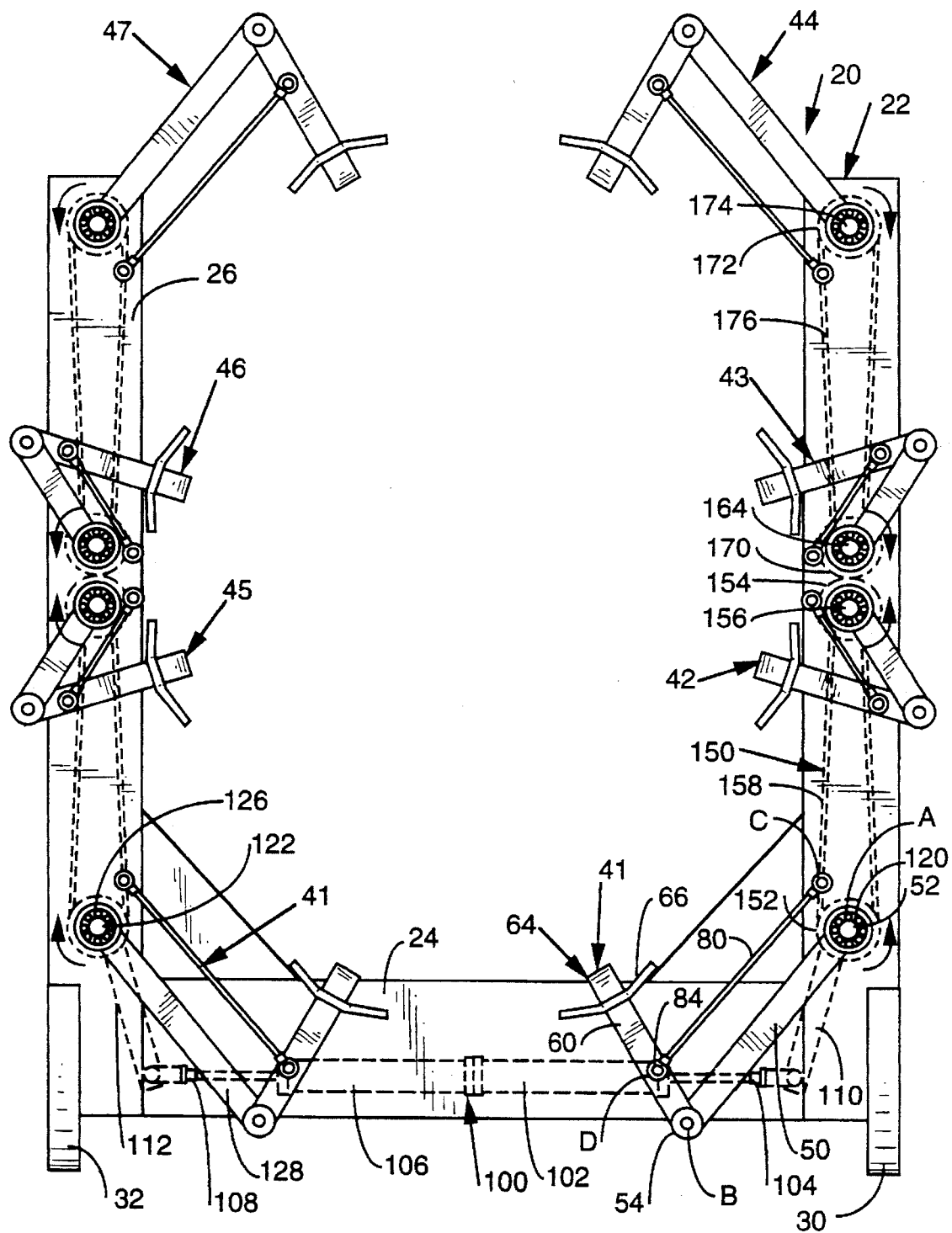
FIG. 6 is a view similar to FIG. 4 only showing the curing envelope engaging means being moved generally radially outwardly.

Referring now to FIGS. 7 and 8, when it is desired to move the curing envelope engaging means 40-47 in a generally radially outward path, hydraulic pressure is introduced into the first cylinder 102 and second cylinder 106 causing outward translational movement of the first cylinder rod 104 and second cylinder rod 108. This in turn rotates the connecting rods 110 and 112 which in turn rotates shafts 120 and 122. The rotating shafts 120 and 122 translate this rotational movement through the bearings 124 and 126 to move the curing envelope engaging means 40 and 41 in generally radially outward path as is shown in FIG. 6. It will be appreciated that in order to accommodate the movement of the cylinder rods 104 and 108, the cylinders 102 and 106 must be free to move downwardly from the position shown in FIG. 5 to the position shown in FIG. 6.

It will be appreciated that the movement of the cylinder rods 104 and 108 cause responsive movement not only of curing envelope engaging means 40 and 41, but also of all the other curing envelope engaging means 42-47 through a linkage system that will be explained with reference to FIGS. 5-8. As can be seen in FIGS. 5-7, a first linkage means 150 is shown which includes a first gear 152 mounted to shaft 120, a second gear 154 mounted to a third rotatable shaft 156 of third curing envelope engaging means 42 and a first endless belt 158 operatively associated with the first gear 152 and second gear 154 so that rotation of the first rotatable shaft 120 causes responsive rotation of the first gear 152 which in turn rotates the second gear 154 by means of the first endless belt 158. It will be appreciated that both first shaft 120 and third shaft 156 rotate in a counter clockwise direction, as shown by the arrows indicated on FIG. 6.

Referring again to FIG. 7, a third-gear 160 is mounted on the third rotatable shaft 156, the third gear 160 being axially spaced from the second gear 154. The third gear 160 meshingly engages a fourth gear 162 that is mounted on a fourth rotatable shaft 164 of the fourth curing envelope engaging means 43. In this way, the fourth rotatable shaft 164 is rotated responsively to the rotation of the third rotatable shaft 156 thus moving the fourth curing envelope engaging means 43 a generally radially outward direction. It will be appreciated that the fourth rotatable shaft 164 rotates in a clockwise direction as shown by the arrow on FIG. 6 which is in a direction opposite in direction to the counterclockwise rotation of the third rotatable shaft 156 due to the fact that the third gear 160 directly engages the fourth gear 162.

A second linkage means 168 includes a fifth gear 170 mounted on the fourth rotatable shaft 164 and axially spaced from the fourth gear 162, a sixth gear 172 mounted to a fifth rotatable shaft 174 of a fifth curing envelope engaging means 44 and a second endless belt 176 operatively associated with the fifth gear 170 and sixth gear 172 so that rotation of the fourth rotatable shaft 164 causes responsive rotation of the fifth rotatable shaft 174 which in turn rotates the sixth gear 172 by means of the second endless belt 176 that then rotates the fifth rotatable shaft 174. In this way, the fifth curing envelope engaging means 44 is moved along with the first, third and fourth curing envelope engaging means by translational movement of the first cylinder rod 104. It will be appreciated that the fifth rotatable shaft 174 rotates in a clockwise direction as shown by the arrow on FIG. 6.

Referring to FIGS. 5 and 6, it will be appreciated that the first curing envelope engaging means 40 and the fifth curing envelope engaging means 44 move a greater generally radially outward distance than the third curing envelope engaging means 42 and the fourth curing envelope engaging means 43. Because of this, the arms of the first curing envelope engaging means 40 and the fifth curing envelope engaging means 44 are greater in length than the arms of the third curing envelope engaging means 42 and the fourth curing envelope engaging means 43.

As can be seen in FIG. 8, the linkage means for moving the sixth curing envelope engaging means 45, the seventh curing envelope engaging means 46 and the eighth curing envelope engaging means 47 are the mirror image of the linkage means for moving the third curing envelope engaging means 42, the fourth curing envelope engaging means 43 and the fifth curing envelope engaging means 44. As such, the linkage means for the sixth, seventh and eighth curing envelope engaging means will not be described in detail. Suffice it to say, that movement of the second cylinder rod 108 of the second cylinder 106 of the double acting hydraulic means 100 causes responsive rotation of the rotatable shafts associated with each of the second, sixth, seventh and eighth curing envelope engaging means through the gears and belts of the linkage means.

Although gears and drive belts have been shown for the linkage means, it will be appreciated that a sprocket and chain drive can be used in their place. The sprocket and chain drive will provide a greater capacity at low RPM's.

Figure 9:
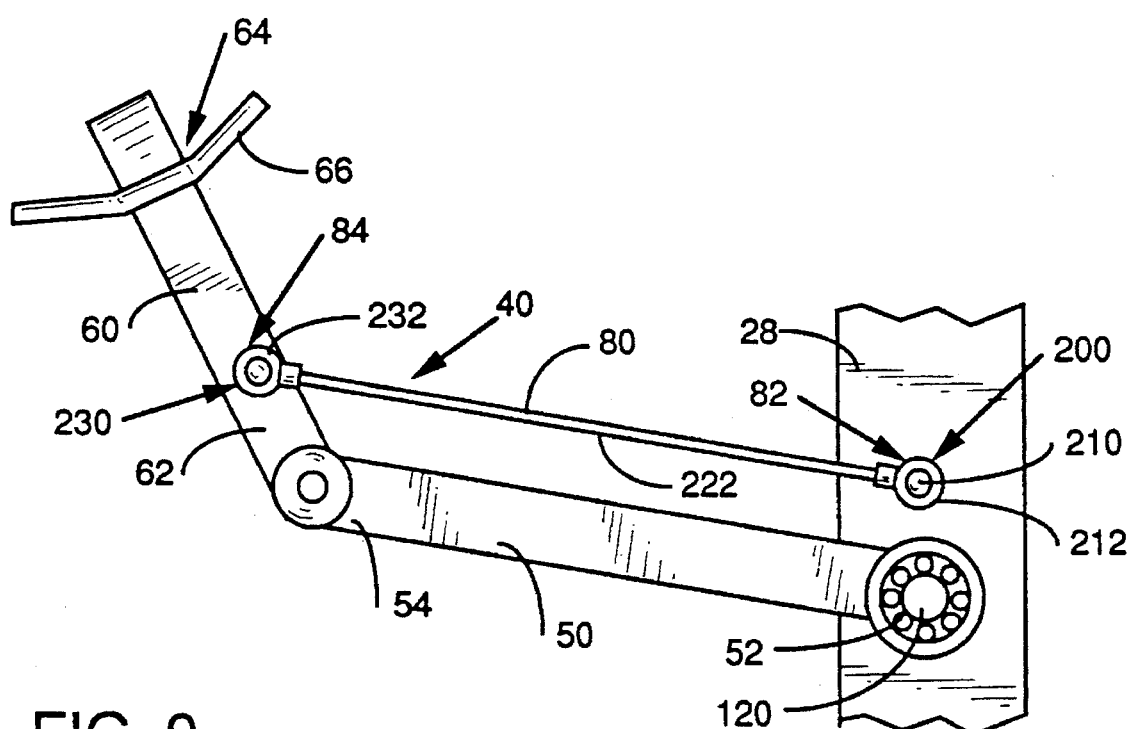
FIG. 9 is a detailed view of one of the curing envelope engaging means.
Figure 10:
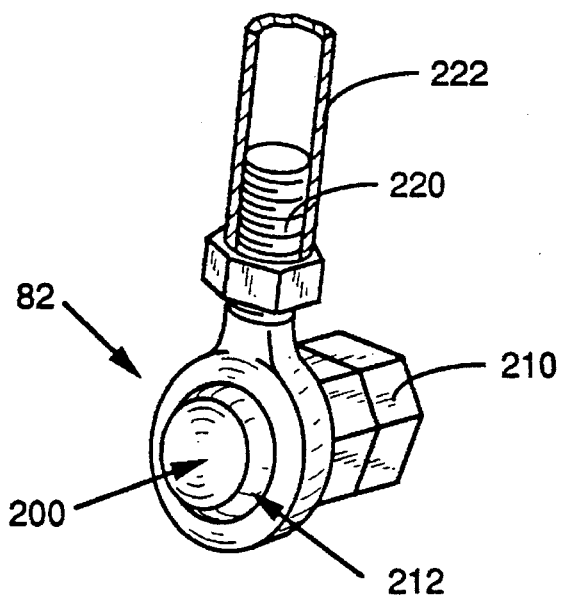
FIG. 10 is a detailed view, partially in section, of a portion of the pantograph rod.

Referring now to FIGS. 9 and 10, the pantograph rod 80 will be discussed. The pantograph rod 80 includes a first end portion 82 pivotably mounted to the right support housing 28 and a second end portion 84 pivotably mounted to the hand 60. As can be seen in FIG. 10, one way to pivotably mount the pantograph rod 80 to the housing 28 and the hand 60 is to provide a ball joint 200 having a ball portion 210 fixedly mounted to the support 28 and a pivot portion 212 that can move relative to the ball portion 210. The pivot portion 212 includes a threaded end 220 which engages into a hollow tube 222 that connects ball joint 200 to ball joint 230 mounted on the arm 60 (FIG. 9) to form the pantograph rod 80. Ball joint 230 is similar to ball joint 200 except that the threaded end 220 of pivot portion 212 of ball joint 200 has an opposite thread than the threaded end (not shown) of the pivot portion 232 of ball joint 230. For example, threaded end 222 can have a right hand thread wherein threaded end (not shown) of pivot portion 232 of ball joint 230 can have a left handed thread. This arrangement facilitates easy initial positioning of the hollow tube 222 with respect to the ball joints 200 and 230.

The method of the invention involves providing a tire casing and then placing a tire tread on the tire casing to create an uncured retreaded tire. The uncured retreaded tire is then encased in a curing envelope by spreading the curing envelope using the curing envelope spreader 20 and placing the uncured retreaded tire therein. The uncured retreaded tire is then cured and after curing the now cured, retreaded tire is removed from the curing envelope by spreading the curing envelope by using the curing envelope spreader 20.

It will be appreciated that a curing envelope spreader and method of retreading a tire using the curing envelope spreader of the invention have been disclosed. The curing envelope spreader effectively and efficiently spread the curing envelope without the need for manual labor. This not only increases productivity of the tire retreading shop but also substantially reduces the incidence of operator injury.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An apparatus for spreading a curing envelope used to encase a tire during a tire retreading process, said apparatus comprising:

a frame;

a plurality of curing envelope engaging means mounted to said frame, each of said curing envelope engaging means movable in a generally radially outward path to spread said curing envelope; and each of said curing envelope engaging means includes (i) an arm having a frame engaging portion pivotably mounted to said frame and hand engaging portion opposite said frame engaging portion; (ii) a hand having an arm engaging portion pivotably mounted to said hand engaging portion of said arm and a curing envelope engaging portion opposite said arm engaging portion and (iii) a pantograph rod having a first end portion pivotably mounted to said frame and a second end portion pivotably mounted to said hand, said pantograph rod is constructed and arranged to remain generally parallel to said arm during movement of said curing envelope engaging means so that said hand moves along said generally radially outward path.

2. The apparatus of claim 1, wherein said curing envelope engaging means are movable in a generally radially inward path after said curing envelope has been spread and said tire has been placed inside said curing envelope so that said curing envelope can encase said tire.

3. The apparatus of claim 1, wherein said frame engaging portion is pivotably mounted to said frame at a first pivot point;

said arm engaging portion of said hand is pivotably mounted to said hand engaging portion of said arm at a second pivot point;

said first end portion of said pantograph rod is pivotably mounted to said frame at a third pivot point;

said second end portion of said pantograph rod is pivotably mounted to said hand at a fourth pivot point; and said first, second, third and fourth pivot point define the corners of a parallelogram throughout the movement of said curing envelope engaging means.

4. The apparatus of claim 3, wherein said curing envelope engaging portion includes a flange that engages a portion of said curing envelope to be spread.

5. The apparatus of claim 4, wherein said flange is generally arcuate in shape.

6. The apparatus of claim 1, including hydraulic means for moving said curing envelope engaging means, said hydraulic means including a cylinder having (i) a first cylinder mounted for reciprocal translational movement with respect to said cylinder and (ii) a cylinder rod mounted for reciprocal translational movement with respect to said cylinder.

7. The apparatus of claim 6, including a first connecting rod having one end portion secured to said first cylinder rod and an opposite end portion secured to a first said curing envelope engaging means and a second connecting rod having one end portion secured to said second cylinder rod and an opposite end portion secured to a second said curing envelope engaging means.

8. The apparatus of claim 7, wherein said first curing envelope engaging means includes a first rotatable shaft;

said second curing envelope engaging means includes a second rotatable shaft;

said opposite end of said first connecting rod being secured to said first rotatable shaft; and said opposite end of said second connecting rod being secured to said second rotatable shaft, whereby translational movement of said first cylinder rod and said second cylinder rod causes responsive rotation of said first rotatable shaft and said second rotatable shaft, respectively.

9. The apparatus of claim 8, including a third curing envelope engaging means including a third said rotatable shaft; and first linkage means for rotating said third rotatable shaft by means of said translational movement of said first cylinder rod.

10. The apparatus of claim 9, wherein said first linkage means includes a first gear mounted to said first rotatable shaft, a second gear mounted to said third rotatable shaft and a first endless belt operatively associated with said first gear and said second gear so that rotation of said first rotatable shaft causes responsive rotation of said first gear which in turn rotates said second gear by means of said first endless belt which then in turn rotates said third rotatable shaft, whereby said first curing envelope means and said third curing envelope means are moved by said hydraulic means.

11. The apparatus of claim 10, including a third gear mounted on said third rotatable shaft, said third gear being spaced apart from said second gear;

a fourth gear mounted on a fourth said shaft of a fourth said curing envelope engaging means, said third gear engaging said fourth gear so that said fourth rotatable shaft is rotated responsively to rotation of said third rotatable shaft, whereby said fourth curing envelope engaging means is moved along with said first, and third curing envelope engaging means by translational movement of said first cylinder rod.

12. The apparatus of claim 11, including second linkage means for rotating a fifth said rotatable shaft of a fifth said curing envelope engaging means.

13. The apparatus of claim 12, wherein said second linkage means includes a fifth gear mounted to said fourth rotatable shaft, a sixth gear mounted to said fifth rotatable shaft and a second endless belt operatively associated with said fifth gear and said sixth gear so that rotation of said fourth rotatable shaft causes responsive rotation of said fifth gear which in turn rotates said sixth gear by means of said second endless belt that then rotates said fifth rotatable shaft, whereby said fifth curing envelope engaging means is moved along with said first, third and fourth curing envelope engaging means by translational movement of said first cylinder rod.

14. The apparatus of claim 13, wherein said first and fifth curing envelope engaging means move a greater generally radially outward distance than said third and fourth curing envelope engaging means.

15. The apparatus of claim 14, including a sixth, seventh and eighth curing envelope engaging means operatively associated with said hydraulic means, each of said sixth, seventh and eighth curing envelope means including a rotatable shaft.

16. The apparatus of claim 15, wherein said first rotatable shaft and said third rotatable shaft rotate clockwise, said fourth rotatable shaft and said fifth rotatable shaft rotate counterclockwise, said second rotatable shaft and said sixth rotatable shaft rotate clockwise and said seventh rotatable shaft and said eighth rotatable shaft rotate counterclockwise when said first, second, third, fourth, fifth, sixth, seventh, and eighth curing envelope engaging means are moved generally radially outward.

17. The apparatus of claim 16, wherein said first rotatable shaft and said third rotatable shaft rotate counterclockwise, said fourth rotatable shaft and said fifth rotatable shaft rotate clockwise, said second rotatable shaft and said sixth rotatable shaft rotate counterclockwise and said seventh rotatable shaft and said eighth rotatable shaft rotate clockwise when said first, second, third, fourth, fifth, sixth, seventh and eighth curing envelope engaging means are moved generally radially inward.

18. The apparatus of claim 17, wherein said curing envelope engaging means are arranged to define a first circle having a first diameter and after said generally radial outwardly movement thereof are arranged to define a second circle having a second diameter, said first circle and said second circle are generally concentric and said first diameter is less than said second diameter.

19. The apparatus of claim 18, wherein said second diameter is approximately the diameter of said tire, so that said tire can be placed in said curing envelope.

20. The apparatus of claim 19, wherein said first diameter is about 12 to 20 inches and said second diameter is about 40 to 60 inches.

21. The apparatus of claim 1, wherein said frame is generally U-shaped and defines an opening through which said tire can pass during said tire retreading process in which a retreaded tire is suspended from an overhead conveyor means by hook means.

22. The apparatus of claim 21, wherein said frame includes a base and a pair of spaced apart support beams extending generally perpendicularly from said base.

23. The apparatus of claim 1, wherein said first end portion and said second end portion of said pantograph rod are pivotably mounted to said frame and said hand, respectively, by means of a pair of ball joints joined by a hollow tube.

24. The apparatus of claim 23, wherein said ball joints each include a threaded end which engages into said hollow tube.

25. The apparatus of claim 24, wherein said threaded end of said ball joint secured to said frame has threads which run opposite to the threads of said ball joint secured to said hand.

* * * * *

UNITED STATES PATENT AND TRADEMARK OFFICE
CERTIFICATE OF CORRECTION

PATENT NO. : 5,658,419

DATED : August 19, 1997

INVENTOR(S) : Herron et al.

It is certified that error appears in the above-identified patent and that said Letters Patent is hereby corrected as shown below:

Col. 5, line 7, insert --in-- after "43".

Col. 7, line 36, insert --rod-- after "cylinder".

Col. 7, line 38, insert --second-- after a.

Signed and Sealed this

Fifteenth Day of May, 2001

Attest:

NICHOLAS P. GODICI

*Attesting Officer*  *Acting Director of the United States Patent and Trademark Office*